July 18, 1939.
C. L. HENRY
2,166,406
CHAIN ADJUSTER
Filed Jan. 23, 1939
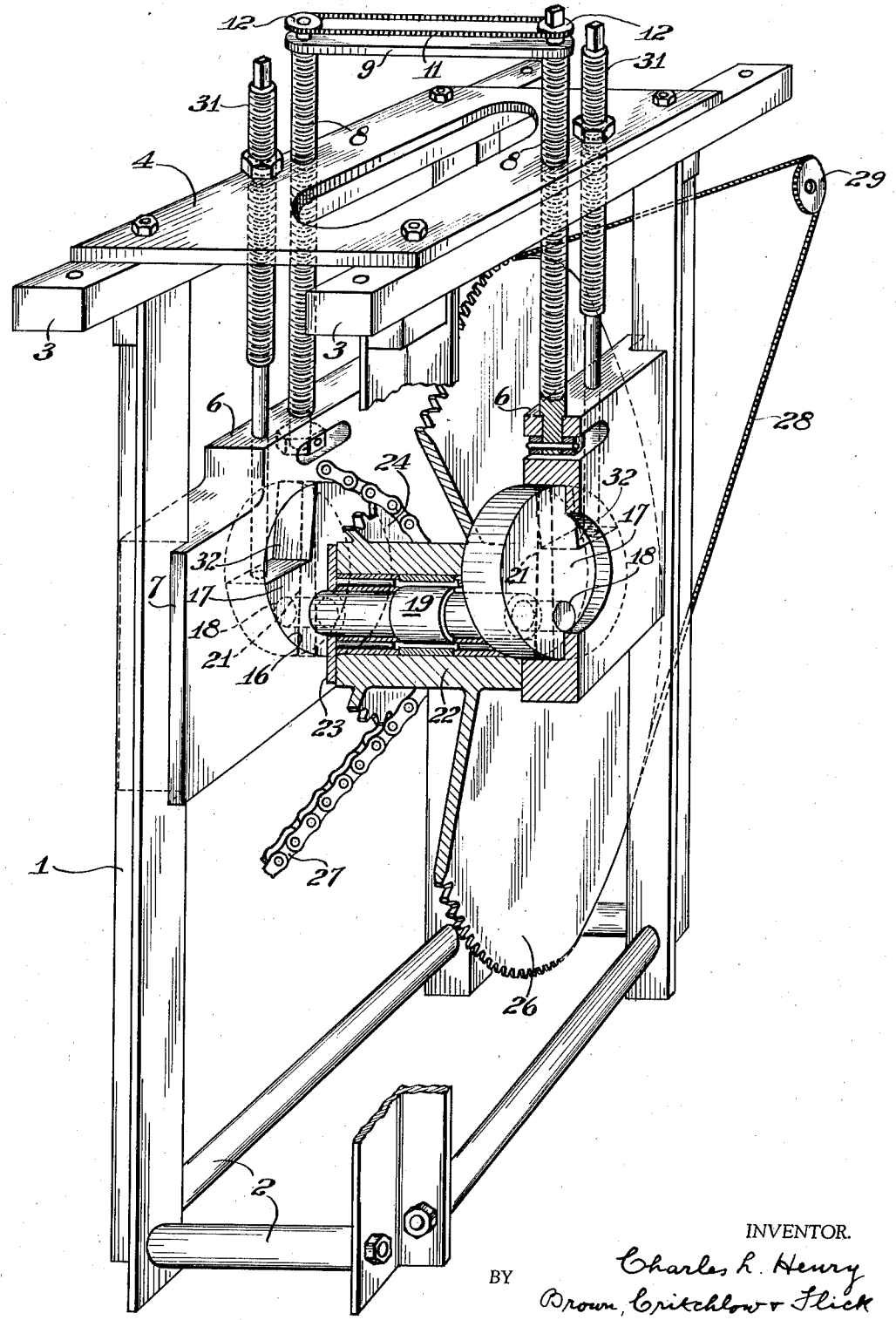
INVENTOR.
Charles L. Henry
BY Brown, Critchlow & Flick
his ATTORNEYS.

Patented July 18, 1939

2,166,406

UNITED STATES PATENT OFFICE 2,166,406

CHAIN ADJUSTER

Charles L. Henry, Pittsburgh, Pa., assignor to Lee C. Moore & Company, Inc., Pittsburgh, Pa., a corporation of Pennsylvania Application January 23, 1939, Serial No. 252,435

6 Claims. (Cl. 74—242.16)

This invention relates to apparatus for tightening sprocket chains and other types of endless belts.

In the use of chains, meaning any endless belt, to drive one shaft from another, such as the chain-driven reductions in the pumping units of oil well equipment, the chains and sprockets wear and the chains stretch. It then becomes necessary to tighten or adjust the chains by moving farther apart the shafts around which the chains pass. Heretofore this has been a long and tedious job because the shaft or shafts which are adjusted have to be adjusted individually and at the same time kept parallel with one another in three planes.

It is among the objects of this invbention to provide a chain adjuster of relatively simple construction which can be quickly and easily operated to tighten the chains, and which automatically keeps the sprocket shafts parallel with one another.

In accordance with this invention a sprocket-carrying shaft is rotatably mounted between two supporting members which are adjustable in unison in parallel planes. The ends of the shaft are so connected to these members that the shaft can swing bodily in an arc around an axis passing through the two members. When the supporting members are moved together in planes parallel to each other and to the plane of the sprockets mounted on the shaft, they carry the shaft with them, whereby the chains that extend from the sprockets laterally to other sprockets spaced from the shaft, are tightened. If one chain becomes tight before the other, continued movement of the supporting members causes the tight chain to swing the shaft bodily in an arc toward the tight chain until the slack in the other chain has also been taken up.

The preferred embodiment of the invention is illustrated in the accompanying drawing in which the single figure is a perspective view, partly broken away and in section, of my chain adjuster.

Referring to the drawing, a frame is formed having four vertical corner posts 1 all of which are parallel to one another and are preferably angle irons. The lower ends of the posts are rigidly connected by suitable braces 2, and the upper ends by a pair of bars 3 joined by a head plate 4. Mounted for vertical sliding movement between each pair of corner posts is a block 6 the ends of which bear against the posts and have flanges 7 overlapping their inner faces to prevent the block from moving outwardly between them. The blocks are thus movable up and down in parallel planes, this movement being accomplished by means of vertical screws 8 threaded in the bars 3 and rotatably mounted in the top of each block. The upper ends of these screws are braced a fixed distance apart by a spacer bar 9 mounted on their reduced ends, and one of the screws is driven from the other by means of a chain 11 and sprockets 12. The screws are so arranged that they maintain the tops of the two blocks in a common horizontal plane at all times.

The inner faces of the two blocks are provided with a pair of axially aligned circular recesses 16 in each of which a circular disc 17 is rotatably mounted. These two discs are provided eccentrically with a pair of axially aligned openings 18 in which the ends of a shaft 19 are mounted. Preferably, the shaft is rigidly mounted in these openings by means of tapered pins 21, and the discs are thick enough to prevent the shaft from tending to twist therein and bring the two openings 18 out of axial alignment. Journaled on shaft 19 is a hub 22 between which and the circular disc washers 23 may be inserted. The hub carries a pair of sprockets 24 and 26 from which chains 27 and 28 extend laterally in opposite directions to outer sprockets, only outer sprocket 29 being shown.

In order to adjust one or both of the chains to take up slack therein, one of the adjusting screws 8 is turned whereby both screws force the two blocks 6 downwardly in unison and thereby move shaft 19 farther from the axes of at least one of the outer sprockets. If one chain is already tight enough, or if it becomes tight before the other, further downward movement of the blocks causes shaft 19, which is prevented by the tight chain from moving farther away from its outer sprocket, to rotate discs 17 in the blocks toward that outer sprocket. This movement of the shaft, combined with the downward movement of the blocks, moves the shaft still farther away from the outer sprocket of the loose chain and thereby tightens the latter.

The circular discs are preferably locked in position after an adjustment has been made, by means of screws 31 that are threaded in bars 3 and each of which extends downwardly through the upper portion of an underlying block 6 where its lower end engages the lower wall of a notch 32 formed in the disc 17 carried by that block. Each notch faces the direction in which the adjacent chain extends, so that when that chain becomes tight and tends to pull the shaft, rotation of the adjacent disc will be prevented by screw 31 bearing against the lower wall of its notch.

Although this invention has been described in connection with chain and sprocket drives, it will be understood that it is also applicable to belt and pulley drives. Therefore, wherever the words "chain" or "sprocket" are used, in this specification and the claims, they are to be construed to likewise mean belt and pulley, respectively.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A chain adjuster comprising a pair of spaced supporting members, means for moving said members bodily laterally in unison in parallel planes, a shaft extending from one member to the other, a pair of sprockets mounted on said shaft, and means connecting the ends of the shaft to said members for arcuate movement around a common axis.

2. A chain adjuster comprising a pair of spaced blocks provided with a pair of axially aligned recesses, a circular member rotatably mounted in each recess, said members being provided eccentrically with a pair of axially aligned openings, a shaft having its ends mounted in said openings, a pair of sprockets mounted on said shaft, and means for moving said blocks in unison parallel to the sprockets.

3. A chain adjuster comprising a pair of spaced blocks provided with a pair of axially aligned recesses, a circular member rotatably mounted in each recess, said members being provided eccentrically with a pair of axially aligned openings, a shaft having its ends mounted in said openings, a pair of sprockets mounted on said shaft, means for moving said blocks in unison parallel to the sprockets, and means for locking said circular members against rotation in said recesses.

4. A chain adjuster comprising a pair of spaced blocks provided with a pair of axially aligned recesses, a circular member rotatably mounted in each recess and provided with a notch, said members being provided eccentrically with a pair of axially aligned openings, a shaft having its ends mounted in said openings, a pair of sprockets mounted on said shaft, means for moving said blocks in unison parallel to the sprockets, and retractible means extending into each block for engaging one of the walls of said notch to hold the block against rotation.

5. A chain adjuster comprising a pair of spaced blocks provided with a pair of axially aligned recesses, a circular member rotatably mounted in each recess, said member being provided eccentrically with a pair of axially aligned openings, a shaft having its ends rigidly mounted in said openings, a pair of sprockets journaled on said shaft, and means for moving said blocks in unison parallel to the sprockets.

6. A chain adjuster comprising a pair of spaced blocks provided with a pair of axially aligned recesses, a circular member rotatably mounted in each recess, said members being provided eccentrically with a pair of axially aligned openings, a shaft having its ends mounted in said openings, a pair of sprockets mounted on said shaft, means for moving said blocks in unison, and means for guiding said blocks in parallel planes extending transversely of said shaft.

CHARLES L. HENRY.